(12) United States Patent
Huang

(10) Patent No.: US 7,778,025 B1
(45) Date of Patent: Aug. 17, 2010

(54) PORTABLE FOLDING HEAT-SINK ASSEMBLY FOR NOTEBOOK COMPUTER

(76) Inventor: Cheng Yu Huang, 3F, 42, Alley 47, Chanshin Road, Taishan, Taipei (TW)

(*) Notice: Subject to any disclaimer, the term of this patent is extended or adjusted under 35 U.S.C. 154(b) by 0 days.

(21) Appl. No.: 12/081,585

(22) Filed: Apr. 17, 2008

(51) Int. Cl.
*G06F 1/20* (2006.01)
*H05K 7/20* (2006.01)

(52) U.S. Cl. .................. 361/679.48; 361/679.55; 361/694; 361/695; 248/346.01; 248/676; 108/63

(58) Field of Classification Search .................. 361/679.46–679.49, 679.55, 690, 694–695; 108/63, 91; 165/80.3; 248/346.01, 346.03, 248/346.07, 346.3
See application file for complete search history.

(56) References Cited

U.S. PATENT DOCUMENTS

| | | | |
|---|---|---|---|
| 7,121,214 B1 * | 10/2006 | Toltzman et al. | 108/43 |
| 7,252,040 B2 * | 8/2007 | Dumond | 108/36 |
| 7,453,694 B2 * | 11/2008 | Lee | 361/679.48 |
| 2002/0146140 A1 * | 10/2002 | Chiu | 381/332 |
| 2006/0061964 A1 * | 3/2006 | Cheng | 361/687 |
| 2006/0260842 A1 * | 11/2006 | Sim et al. | 174/562 |

FOREIGN PATENT DOCUMENTS

| | | | |
|---|---|---|---|
| CN | 201203838 Y | * | 3/2009 |
| JP | 05243772 A | * | 9/1993 |

* cited by examiner

*Primary Examiner*—Jayprakash N Gandhi
*Assistant Examiner*—Robert J Hoffberg
(74) *Attorney, Agent, or Firm*—Jackson IPG PLLC

(57) ABSTRACT

A portable folding heat-sink assembly for notebook computers implements two or more housings connected at adjacent sides thereof with one or more pivot shafts. Furthermore, heat-sink fans, a circuit board, a switch, and an indication lamp may be optionally settled in some of the housings. Anti-slip pads and supports may be provided at the bottoms of the housings while adjustable pedestals may be provided on the housings. Thus, by the pivot shafts, the heat sink assembly can be expanded for use and can be folded into a reduced volume for portage. Besides, the heat sink assembly can be uprighted on a table to function as an electric cooling fan.

2 Claims, 7 Drawing Sheets

PORTABLE FOLDING HEAT-SINK ASSEMBLY FOR NOTEBOOK COMPUTER

BACKGROUND OF THE INVENTION

1. Technical Field

The present invention relates to heat-sink assemblies for notebook computers. More particularly, the present invention relates to a heat-sink assembly for notebook computers that can be expanded for use and folded for portability. Moreover, the heat-sink assembly can be uprighted on a table to function as an electric cooling fan.

2. Description of Related Art

Generally, a notebook computer is advantageous for its light weight and small size and suitable for being portable and used at various places. However, such notebook computer, because of its structural limitation rendered by its restricted size, has an inferior heat-sink effect as compared with a desktop computer At a bottom of such notebook computer close to the hard drive, the central processing unit and the power supply, tends to get heated and therefore heat-sink devices have been provided for being placed under the notebook computer to facilitate the heat-sink effect. However, the conventional heat-sink devices are typically designed to be an integral piece slightly larger than a bottom of a notebook computer and are inconvenient to be carried. Besides, since the conventional heat-sink devices are changeless in their structures and shapes, variability thereof needs to be improved.

SUMMARY OF THE INVENTION

In view of the aforementioned shortcomings of the conventional heat-sink devices, the inventor of the present invention, by virtue of his numerous years of experience in the art, proposes a portable folding heat-sink assembly for notebook computers, wherein the heat-sink assembly implements two or more housings connected at adjacent sides thereof with one or more pivot shafts. Furthermore, heat sink fans, a circuit board, a switch, and an indication lamp may be optionally settled in some of the housings. Anti-slip pads and supports may be provided at bottoms of the housings while adjustable pedestals may be provided on the housing. Thus, by the pivot shafts, the heat sink assembly can be expanded for use and can be folded into a reduced volume for portage. Besides, the heat-sink assembly can be uprighted on a table to function as an electric cooling fan.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 1:
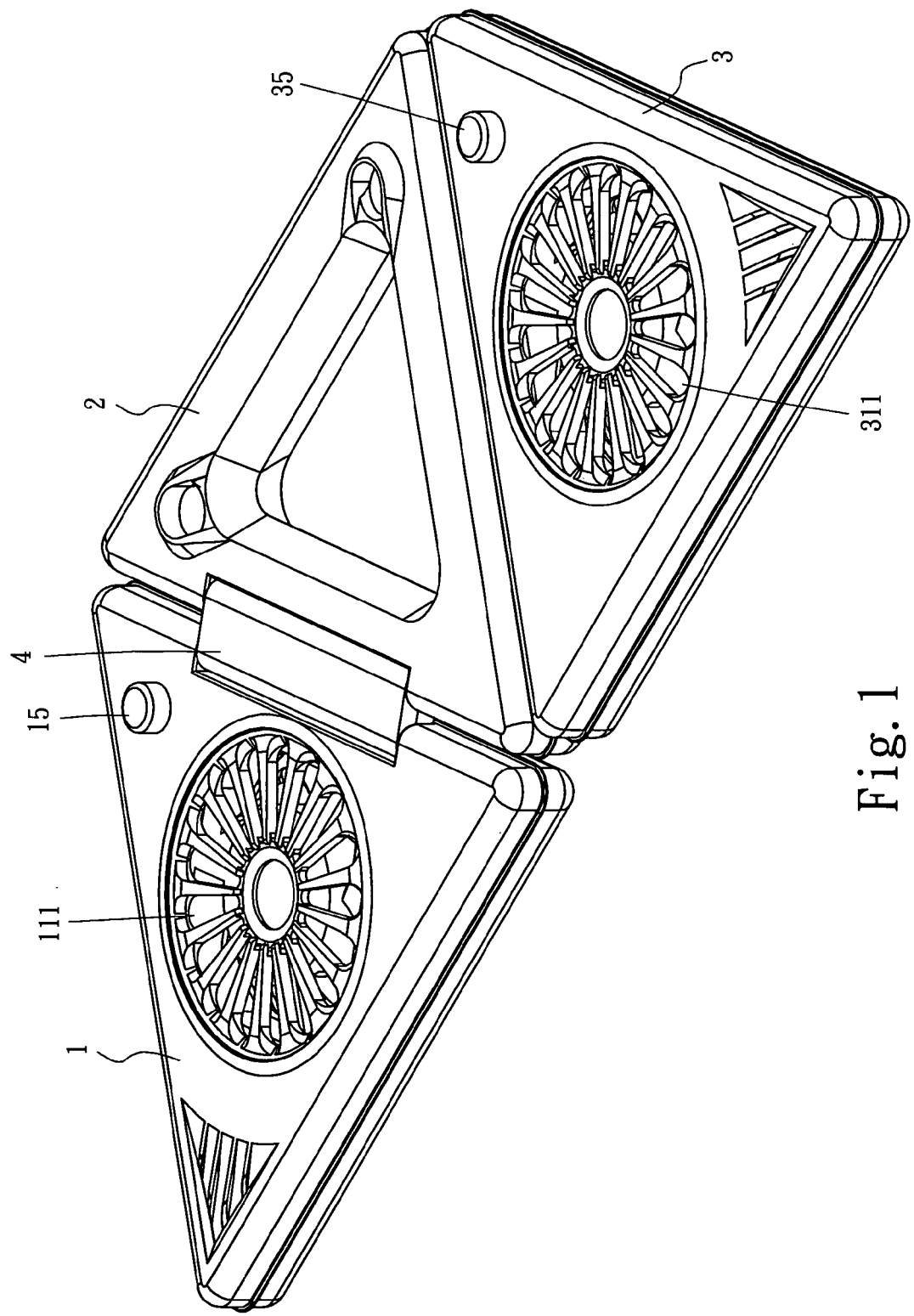
FIG. 1 is a perspective view of the disclosed subject matter of the present invention.
Figure 2:
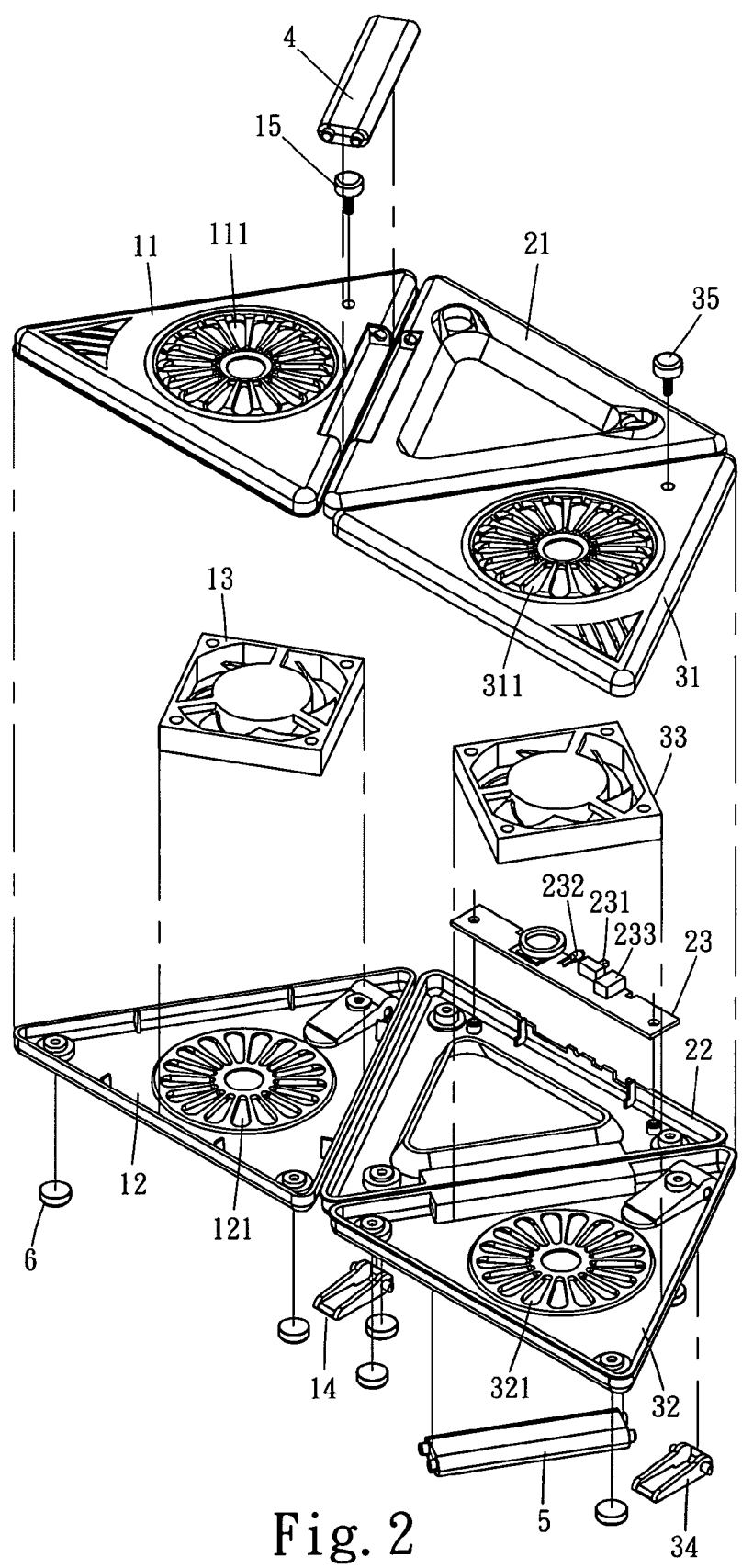
FIG. 2 is an exploded view of the disclosed subject matter of the present invention.

Please refer to FIGS. 1 and 2. Therein, a portable folding heat-sink assembly for notebook computers of the present invention primarily comprises of two or more housings 1, 2 or 3 having adjacent sides thereof connected by pivot shafts 4 or 5. In addition, heat-sink fans 13, 33 are optionally settled in two of the housings 1, 2 and 3. Thereby, when the housings 1, 2 and 3 are relatively expanded, a notebook computer can be placed thereon to receive a heat sink effect. When the housings 1, 2 and 3 are folded and relatively retracted, an overall volume thereof can be reduced so as to facilitate its portability. Moreover, when the heat-sink assembly is upright on a table, it can function as an electric fan for cooling a user.

As illustrated in FIG. 2, each said housing 1, 2 or 3 is composed of an upper cover 11, 21 or 31 and a lower cover 12, 22, or 32.

Figure 4:
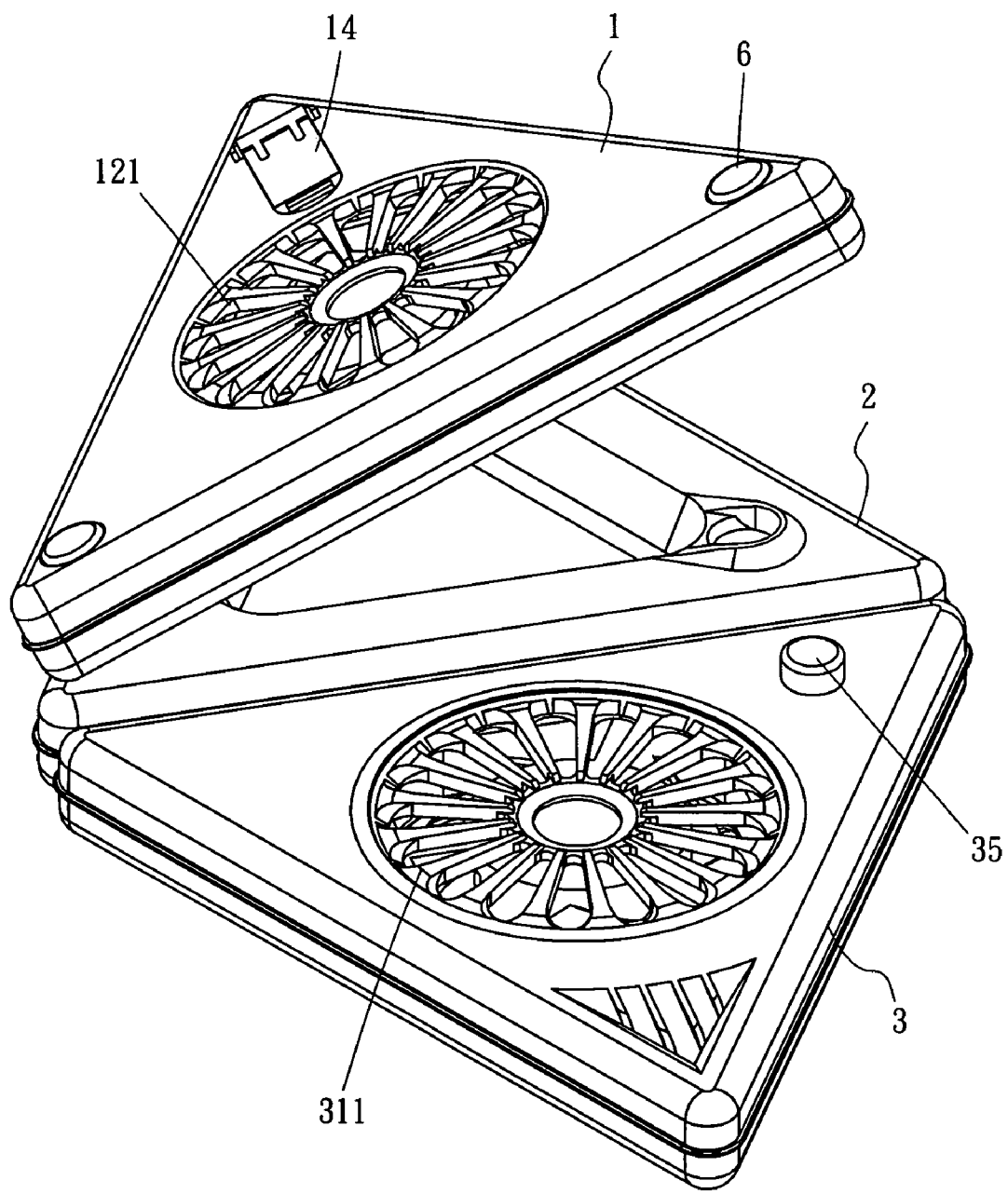
FIG. 4 is a schematic drawing showing power cords of a heat sink fan connected to a circuit board according to the present invention.
Figure 5:
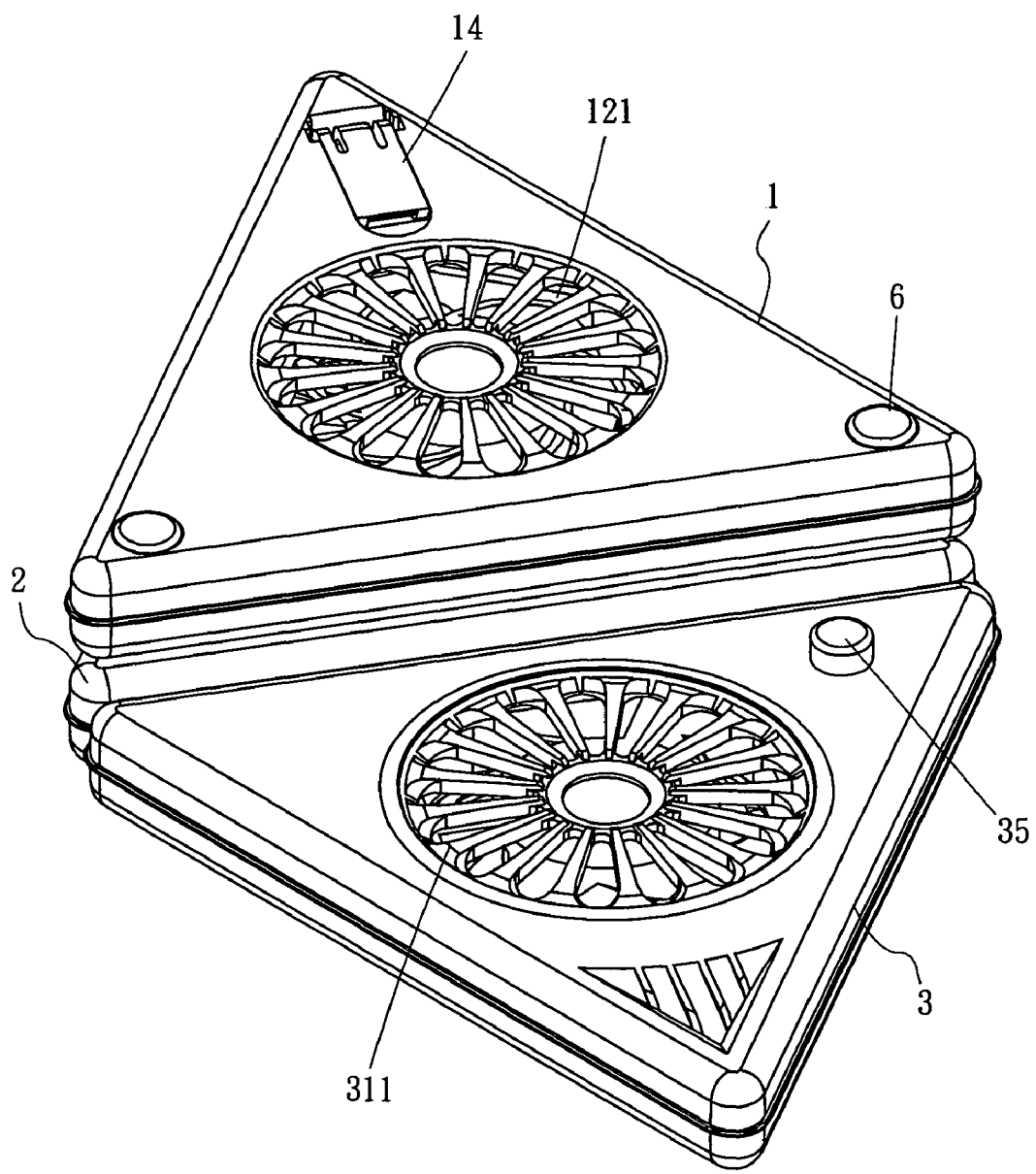
FIG. 5 is another applied view of the disclosed subject matter of the present invention.
Figure 6:
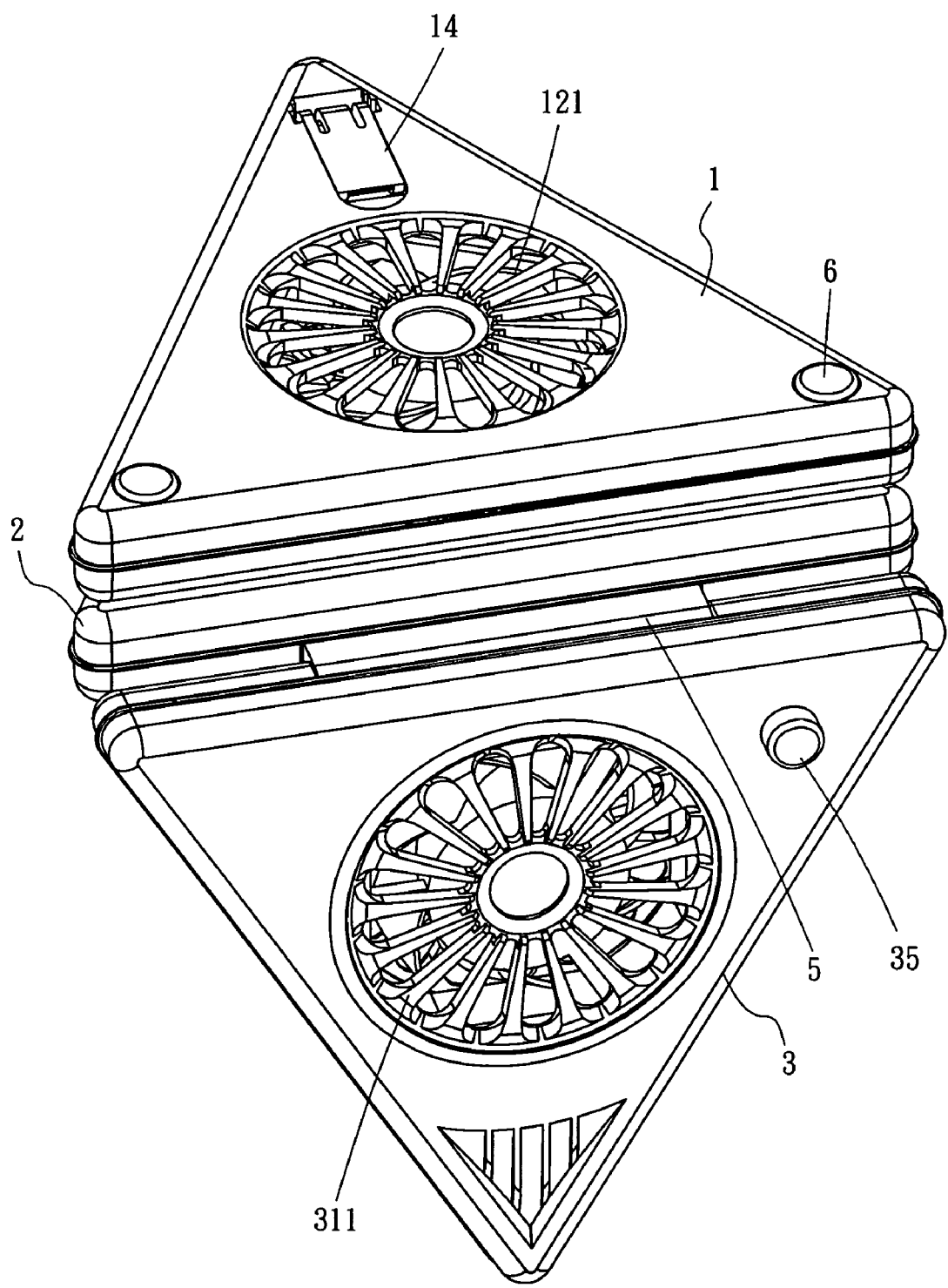
FIG. 6 is still another applied view of the disclosed subject matter of the present invention.
Figure 7:
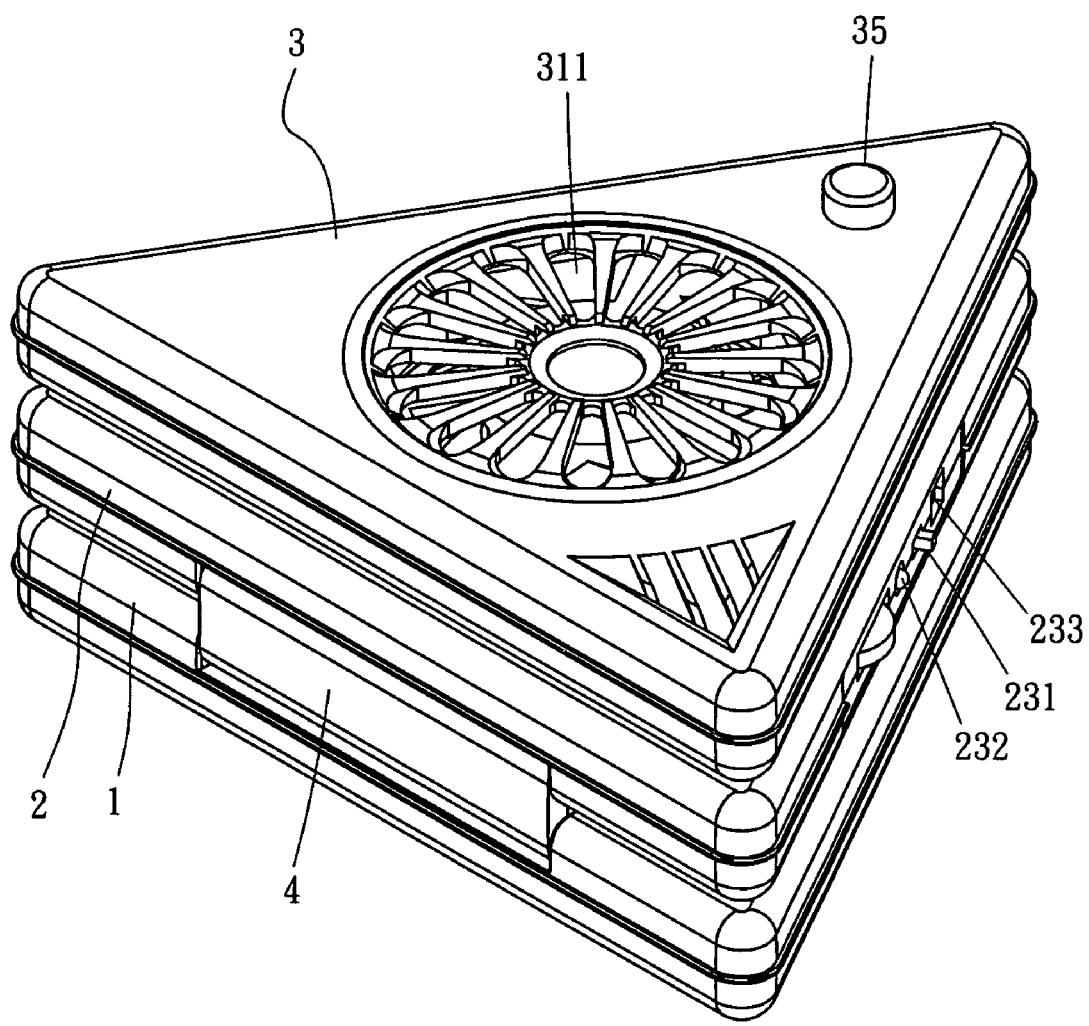
FIG. 7 is yet another applied view of the disclosed subject matter of the present invention.

The housings 1, 2 and 3 have adjacent sides thereof connected by pivot shafts 4 and 5, so that the housings 1, 2 and 3 can be relatively expanded or folded, as shown in FIGS. 4 through 6.

The heat-sink fans 13, 33 are optionally deposited in some of the housings 1, 2 and 3 so as to provide ventilation and a heat-sink effect in assistance of air vents 111, 311, 121, and 321 formed on housings 1 and 3.

A circuit board 23 is settled in one said housing 1, 2 or 3 and comprises a switch 231, an indication lamp 232 and a power terminal 233.

Figure 3:
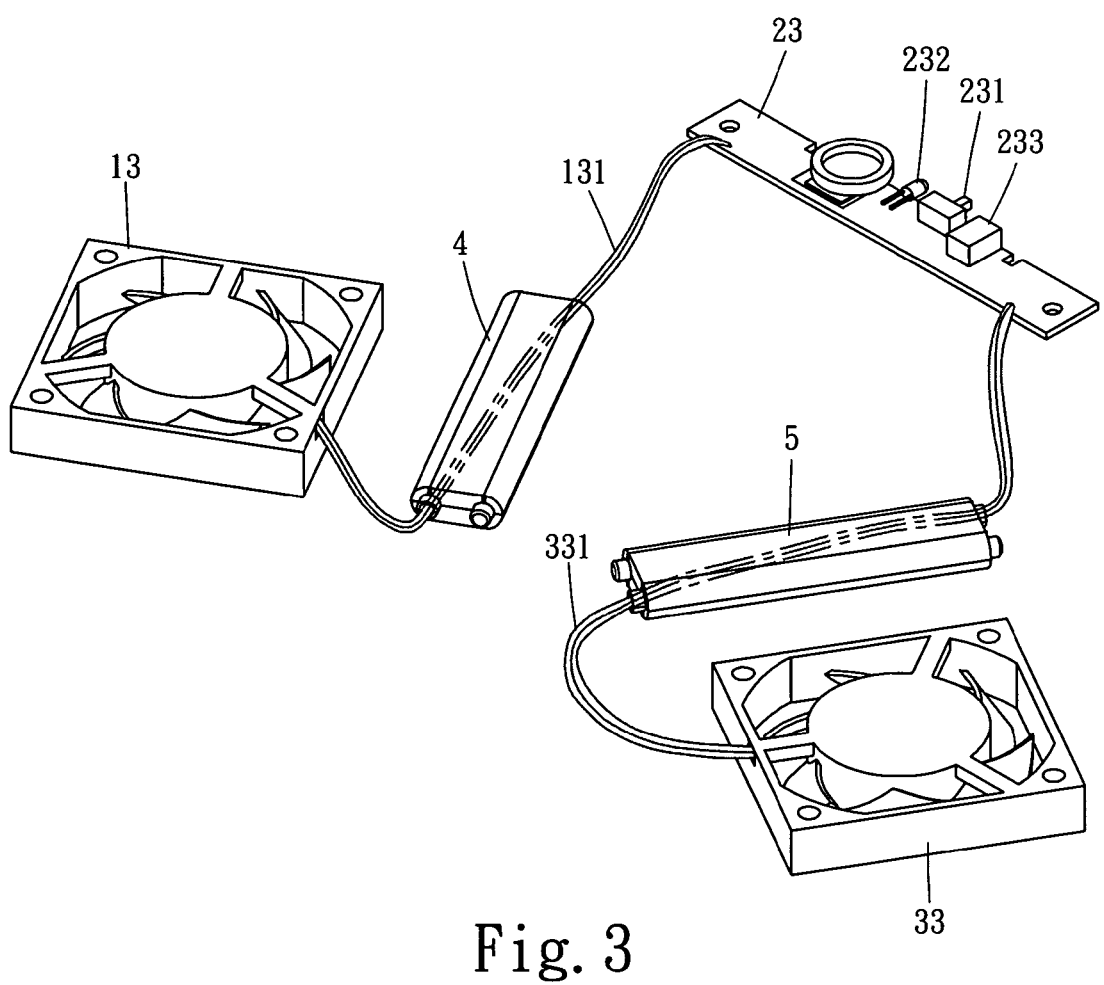
FIG. 3 is an applied view of the disclosed subject matter of the present invention.

Power cords 131, 331 of the heat-sink fans 13, 33 are pierced through the pivot shafts 4 and 5, respectively, to be electrically connected to the circuit board 23, as shown in FIG. 3.

A plurality of anti-slip pads 6 are provided at bottoms of the housings 1, 2 and 3. Besides, supports 14, 34 may be provided at the bottoms of some of the housings 1 and 3 while adjustable pedestals 15, may be provided on some of the housings 1 and 3.

Each of the housings 1, 2 and 3 of the portable folding heat sink assembly for notebook computers may be shaped as a triangle, a rectangle, or a polygon, according to needs in practice.

To sum up, by the pivot shafts, the heat-sink assembly can be expanded for use and can be folded into a reduced volume for portage. Besides, the heat sink assembly can be uprighted on a table to function as an electric cooling fan.

What is claimed is:

1. A portable folding heat-sink assembly for a notebook computer, comprising:
 a first housing assembly comprising:
  a first housing;
  a circuit board comprises a switch, an indication lamp and a power terminal, the circuit board is mounted in the first housing; and
  a first plurality of anti-slip pads provided at the bottom of the first housing;
 a plurality of second housing assemblies, each of the second housing assemblies comprises
  a second housing;
  an electric fan comprises a power cord, the electric fan is mounted in the each of the second housings, a first air vent provided on a top of the each of the second housings;

a second air vent provided on a bottom of the each of the second housings, the first air vent and second air vent allow for the electric fan to ventilate through the each of the second housings;

a second plurality of anti-slip pads provided at the bottom of the each of the second housings;

a support provided at the bottom of the each of the second housings; and an adjustable pedestal provided on the top of the each of the second housings; and a plurality of pivot shafts, each of the plurality of pivot shafts is connecting the each of the second housing assemblies to the first housing assembly so as to allow the heat-sink assembly to be expanded or folded, the power cord of each of the electric fans is pierced through the each of the plurality of pivot shafts to be electrically connected to the circuit board.

2. The portable folding heat-sink assembly of claim 1, wherein the first housing and the each of the second housings are shaped as one of a triangle, a rectangle, and a polygon.

* * * * *